(12) United States Patent
Gupta et al.

(10) Patent No.: US 6,567,857 B1
(45) Date of Patent: May 20, 2003

(54) METHOD AND APPARATUS FOR DYNAMIC PROXY INSERTION IN NETWORK TRAFFIC FLOW

(75) Inventors: Amit Gupta, Fremont, CA (US); Geoffrey Baehr, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/363,472

(22) Filed: Jul. 29, 1999

(51) Int. Cl.[7] ............................................. G06F 13/00
(52) U.S. Cl. ....................... 709/238; 709/242; 370/235
(58) Field of Search ................................ 709/239, 238, 709/242; 370/235, 237

(56) References Cited

U.S. PATENT DOCUMENTS

| | | | | |
|---|---|---|---|---|
| 5,905,872 A | * | 5/1999 | DeSimone et al. | 709/245 |
| 6,073,175 A | * | 6/2000 | Tavs et al. | 709/226 |
| 6,101,549 A | * | 8/2000 | Baugher et al. | 709/238 |
| 6,349,336 B1 | * | 2/2002 | Sit et al. | 709/227 |
| 6,389,462 B1 | * | 5/2002 | Cohen et al. | 709/218 |

OTHER PUBLICATIONS

*Hypertext Transfer Protocol.* Fielding, R. et al. Network Working Group, RFC Archive, SunSITE Denmark, Jun. 1999, pp1–158.

* cited by examiner

*Primary Examiner*—Kenneth R. Coulter
(74) *Attorney, Agent, or Firm*—Gunnison, McKay & Hodgson, L.L.P.; Philip J. McKay

(57) ABSTRACT

In embodiments of the invention, a method and apparatus for dynamic proxy insertion in network traffic path is described. According to one or more embodiments of the invention, a request and/or response message may be modified to include one or more thru-proxy tags to identify a network (or traffic) node (e.g., a proxy, server, or intermediary). For example, a request directed to a server or a response directed to a client may be altered to insert a plurality of intermediate or final destination designations. In so doing, a path of a request or response may be altered dynamically. A thru-proxy tag in a response may be inserted in a related request to identify a destination or node such that the request is sent to the destination in the thru-proxy tag before being sent to an origin server. Thru-proxy tags may be used to identify multiple and/or alternate destinations.

7 Claims, 7 Drawing Sheets

METHOD AND APPARATUS FOR DYNAMIC PROXY INSERTION IN NETWORK TRAFFIC FLOW

BACKGROUND OF THE INVENTION

1. Field of the Invention

This invention relates to computer software and, more particularly, to the use of proxies in network traffic flow.

Portions of the disclosure of this patent document may contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever. Sun, Sun Microsystems, the Sun logo, Java and all Java-based trademarks and logos are trademarks or registered trademarks of Sun Microsystems, Inc. in the United States and other countries. All SPARC trademarks are used under license and are trademarks or registered trademarks of SPARC International in the United States and other countries. Products bearing SPARC trademarks are based upon an architecture developed by Sun Microsystems, Inc.

2. Background Art

A distributed system typically distributes functionality (e.g., computing or other services, storage, input/output, etc.) across multiple locations (or network nodes). The Internet is an example of a global-scale, highly available distributed system that interconnects computing networks. and computer systems that can provide functionality. In a distributed system, information (e.g., text, graphics, sound, image, etc.) may be obtained from a variety of sources. It is becoming increasingly easier for computer system users to become interconnected. As more and more users are added to the Internet, for example, there is an increase in the amount of information that is transmitted via the Internet. The information may need to be created or modified (or customized) before it is transmitted to its destination. Such information creation, customization and dissemination cannot scale with today's networking technology.

A proxy is a computer system (or software that executes on a computer system) that can provide various functionality. A proxy has been used to reduce the amount of information that must be transmitted via a network. Initially, a proxy was used to communicate across ("get over") a firewall (i.e., a mechanism used to protect information in internal computer networks from external access). Proxies have since been used to cache (or store) information. In so doing, the information may be locally stored and available to each user of the internal computer network. The cached information was available to service multiple requests without requiring that it first be obtained from an external source thereby reducing the amount of network traffic.

A proxy can be used to provide other functionality such as content transformation (e.g., compression, decompression, encryption, decryption and reformatting), controlled external access to corporate intranets (sun.net reverse proxy), and for use in advertising and marketing on the Internet.

Thus, proxies can be adapted to provide additional and/or special-purpose functionality that can be used to meet the increasing need for information of interconnected computer systems and their users. However, there is a need to be able to ensure that the information flows through the desired proxy or proxies.

To better understand the need for ensuring the use of proxies, the following discussion of networks, the Internet and related topics is provided.

Networks

In modern computing environments, it is commonplace to employ multiple computers or workstations linked together in a network to communicate between, and share data with, network users. A network also may include resources, such as printers, modems, file servers, etc., and may also include services, such as electronic mail.

A network can be a small system that is physically connected by cables (a local area network or "LAN"), or several separate networks can be connected together to form a larger network (a wide area network or "WAN"). Other types of networks include the Internet, tel-com networks, the World Wide Web, intranets, extranets, wireless networks, and other networks over which electronic, digital, and/or analog data may be communicated.

Computer systems sometimes rely on a server computer system to provide information to requesting computers on a network. When there are a large number of requesting computers, it may be necessary to have more than one server computer system to handle the requests.

The Internet

The Internet is a worldwide network of interconnected computers. An Internet client accesses a computer on the network via an Internet provider. An Internet provider is an organization that provides a client (e.g., an individual or other organization) with access to the Internet (via analog telephone line or Integrated Services Digital Network line, for example). A client can, for example, read information from, download a file from or send an electronic mail message to another computer/client using the Internet.

To retrieve a file or service on the Internet, a client must search for the file or service, make a connection to the computer on which the file or service is stored, and download the file or service. Each of these steps may involve a separate application and access to multiple, dissimilar computer systems. The World Wide Web (WWW) was developed to provide a simpler, more uniform means for accessing information on the Internet.

The components of the WWW include browser software, network links, servers. and WWW protocols. The browser software, or browser, is a user-friendly interface (i.e., front-end) that simplifies access to the Internet. A browser allows a client to communicate a request without having to learn a complicated command syntax, for example. A browser typically provides a graphical user interface (GUI) for displaying information and receiving input. Examples of browsers currently available include Mosaic, Netscape Navigator and Communicator, Microsoft Internet Explorer, and Cello.

Information servers maintain the information on the WWW and are capable of processing a client request. Hypertext Transport Protocol (HTTP) is the standard protocol for communication with an information server on the WWW. HTTP has communication methods that allow clients to request data from a server and send information to the server.

To submit a request, the client contacts the HTTP server and transmits the request to the HTTP server. The request contains the communication method requested for the transaction (e.g., GET, PUT or POST). A GET method is a request may be used to retrieve a file or other information. A PUT method request is commonly used to store information that is contained in the request. A POST method may be used to process information in some manner (e.g., operate on the information contained in the request by a software program). The HTTP server responds to the client by sending a response (e.g., the requested information). The connection is terminated between the client and the HTTP server once the transaction is complete.

A client request therefore, consists of establishing a connection between the client and the HTTP server, performing the request, and terminating the connection. The HTTP server does not retain any information about the request after the connection has been terminated. HTTP is, therefore, a stateless protocol. That is, a client can make several requests of an HTTP server, but each individual request is treated independent of any other request. The server has no recollection of any previous request.

Instead of transmitting the information from the server that maintains the information, some systems utilize what is referred to as a proxy. Referring to FIG. 1A, proxy 102 acts as an intermediary between client 100 and server 104. Request 108 may be sent from client 100 to server 104 via path 118. However, instead of sending request 108 to server 104 via path 118, request 108 may be transmitted to proxy 102 via path 122. Proxy 102 may have the ability to carry out the request and return a response to client 100. If proxy 102 is not capable of replying to request 108, it forwards request 108 to server 104 via path 124. Proxy 102 may be configured to modify request 108 (e.g., reformatting, translating or transforming the some or all of the information contained in request 108) before forwarding it to server 104.

Similarly, instead of sending response 110 directly to client 100 via path 120, server 104 can send response 110 to client 100 via traffic path 126. Proxy 102 forwards response 110 via traffic path 128 to client 100. Proxy 102 may retain copies of documents or information fetched by request 108 for some time so that they can be accessed more quickly in the future, speeding up access for commonly requested information. This maintaining of information and fetched documents by proxy 102 is referred to as caching and the information maintained in the proxy 102 is referred to as a cache or proxy cache.

In the example of FIG. 1A, a single proxy is illustrated. It is possible to have multiple proxies or other types of intermediaries (e.g., a tunnel, a server such a gateway, etc.) between client 100 and server 104. A tunnel acts as a blind relay between two connections (e.g., client 100 and server 104). A gateway is typically used to connect two or more networks.

Because a gateway is used to connect networks, it sometimes includes or is used in conjunction with a firewall. A firewall is a mechanism that is used to protect information in internal computer networks from external access by blocking access between the client and the server. To provide limited access to information, a proxy or proxy server may sit atop a firewall and act as a conduit, providing a specific connection for each network connection. Proxy software retains the ability to communicate with external sources, yet is trusted to communicate with the internal network. For example, proxy software may require a username and password to access certain sections of the internal network and completely block other sections from any external access.

An addressing scheme is employed to identify Internet resources (e.g., HTTP server, file or program). This addressing scheme is called Uniform Resource Locator (URL). A URL contains the protocol to use when accessing the server (e.g., HTTP), the Internet domain name of the site on which the server is running, the port number of the server, and the location of the resource in the file structure of the server.

The WWW uses a concept known as hypertext. Hypertext provides the ability to create links within a document to move directly to other information. To activate the link, it is only necessary to click on the hypertext link (e.g., a word or phrase). The hypertext link can be to information stored on a different site than the one that supplied the current information. A URL is associated with the link to identify the location of the additional information. When the link is activated, the client's browser uses the link to access the data at the site specified in the URL.

If the client request is for a file, the HTTP server locates the file and sends it to the client. An HTTP server also has the ability to delegate work to gateway programs. The Common Gateway Interface (CGI) specification defines a mechanism by which HTTP servers communicate with gateway programs. A gateway program is referenced using a URL. The HTTP server activates the program specified in the URL and uses CGI mechanisms to pass program data sent by the client to the gateway program. Data is passed from the server to the gateway program via command-line arguments, standard input, or environment variables. The gateway program processes the data and returns its response to the server using CGI (via standard input, for example). The server forwards the data to the client using the HTTP.

A browser displays information to a client/user as pages or documents (referred to as "web pages" or "web sites"). A language is used to define the format for a page to be displayed in the WWW. One example of a language that may be used to define a page is called Hypertext Markup Language (HTML). Other examples of languages include Standard Generalized Markup Language ("SGML") and Extensible Markup Language ("XML"). To illustrate with reference to HTML, a WWW page is transmitted to a client as an HTML document. The browser executing at the client parses the document and displays a page based on the information in the HTML document.

HTML is a structural language that is comprised of HTML elements that are nested within each other. An HTML document is a text file in which certain strings of characters, called tags, mark regions of the document and assign special meaning to them. These regions are called HTML elements. Each element has a name, or tag. An element can have attributes that specify properties of the element. Blocks or components include unordered list, text boxes, check boxes, and radio buttons, for example. Each block has properties such as name, type, and value. The following provides an example of the structure of an HTML document:

<HTML>
  <HEAD>
  .... element(s) valid in the document head
  </HEAD>
  <BODY>
  .... element(s) valid in the document body
  </BODY>
</HTML>

Each HTML element is delimited by the pair of characters "<" and ">". The name of the HTML element is contained within the delimiting characters. The combination of the name and delimiting characters is referred to as a marker, or tag. Each element is identified by its marker. In most cases, each element has a start and ending marker. The ending marker is identified by the inclusion of an another character, "/" that follows the "<" character.

HTML is a hierarchical language. With the exception of the HTML element, all other elements are contained within another element. The HTML element encompasses the entire document. It identifies the enclosed text as an HTML document. The HEAD element is contained within the HTML element and includes information about the HTML document. The BODY element is contained within the HTML. The BODY element contains all of the text and other information to be displayed. Other HTML elements are described in HTML reference manuals.

In the example of FIG. 1A, request 108 and response 110 are transmitted between client 100 and 104 via proxy 102. By specifying a static set of preferences, a browser that is running on client 100 may be configured to direct request 108 to proxy 102. That is, the browser's preference may be set to direct a type (e.g., a given communications protocol such as HTTP) of requests to a specific proxy. If the browser's preference setting identifies proxy 102 as the proxy for the type of request 108, for example, request 108 is directed to proxy 102. This mechanism allows a user to statically set a preference for a proxy either by identifying a proxy's URL or a URL of a configuration file that contains a proxy's URL. A network address associated with a proxy may be obtained using a proxy advertisement mechanism (e.g., SLP or Web Proxy Auto Discovery (WPAD)). To change a proxy, the user must change the proxy designation in the browser's preference or the configuration file. There is no ability to dynamically set a proxy based on each request that is generated by the browser, for example.

As an alternative to statically identifying a proxy in a browser's preference settings, HTTP (i.e., HTTP version 1.1, or HTTP/1.1, discussed in Request For Comments (RFC) 2616) provides a redirection mechanism that allows server 104 to redirect request 108 to proxy 102 and requires the requester to repeat each request twice to complete the redirection. Referring to FIG. 1B, client 100 send request 108 to server 104. Server 104 transmits a response that contains a redirection status code and identifies proxy 102. In RFC 2616 (see section 10.3.6), the status code is referred to as a "305 Use Proxy."

Upon receipt of request redirection 112 (i.e., status code 305), client 100 resends request 108 to proxy 102. Proxy 102 process request 108 as described above (e.g., provides a response, forwards request 108 to server, etc.). A disadvantage of this approach is that client 100 must send request 108 at least twice, once to server 104 and then to proxy 102. Further, the redirection mechanism is only available for use by server 104. Therefore, client 100 is dependent on server 104 to provide redirection information which may not be possible if server 104 is unavailable (e.g., behind a firewall or not operational). In addition, the redirection mechanism in HTTP can only be used to redirect a single request. That is, client 100 must access server 104 to obtain redirection information for subsequent requests.

A mechanism is needed to dynamically insert proxies or intermediaries (e.g., gateway, tunnel, server, etc.) in a network traffic path.

SUMMARY OF THE INVENTION

In embodiments of the invention, a method and apparatus for dynamic proxy insertion in network traffic path is described. According to one or more embodiments of the invention, a request and/or response message may be modified to identify a network (or traffic) node (e.g., a proxy, server, or intermediary). For example, a request directed to a server or a response directed to a client may be altered to insert a plurality of intermediate or final destination designations. In so doing, a path of a request or response may be altered dynamically.

In one or more embodiments of the invention, a thru-proxy tag is inserted in a response or request message to identify a network node or location. A response message may be modified by a receiving node to add a thru-proxy tag. If a response message that contains a thru-proxy tag is received by a client, the client retains the proxy identifier for use with subsequent requests. A request that is directed to an origin server that contains a thru-proxy tag is sent to the network node or location that is identified in the tag prior to sending the request to the origin server. A request may be modified by a receiving node to add a thru-proxy tag. The node that is identified in a thru-proxy tag may delete the tag from either the request or the response.

When generating a request, a client determines whether a request is related to a previous response and whether there is a thru-proxy tag associated with previous response. If so, the client adds the thru-proxy tag to the request. A request may be related to a previous response, if the request is initiated from a Web page sent in the previous response, for example. For example, a request for a resource identified by a hyperlink in a Web page is related to the response that contained the Web page. A request may be related to a previous response where the request is directed to the same location that provided the previous response. These are examples of the relationships that may exist between a response and a request. Other types of relationships may be used with one or more embodiments of the invention.

Since embodiments of the invention allow dynamic proxy designation, it is possible to specify a proxy for a given situation (e.g., a given request or resource). The dynamic proxy designation of one or more embodiments of the invention may specify a proxy for inclusion in more than one request. Further, embodiments of the invention provide a mechanism to designate a proxy at different levels (e.g. a default and overriding designations) and for multiple protocols.

DETAILED DESCRIPTION OF THE INVENTION

A method and apparatus for dynamic proxy insertion in network traffic flow is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Embodiment of Computer Execution Environment (Hardware)

Figure 1A:
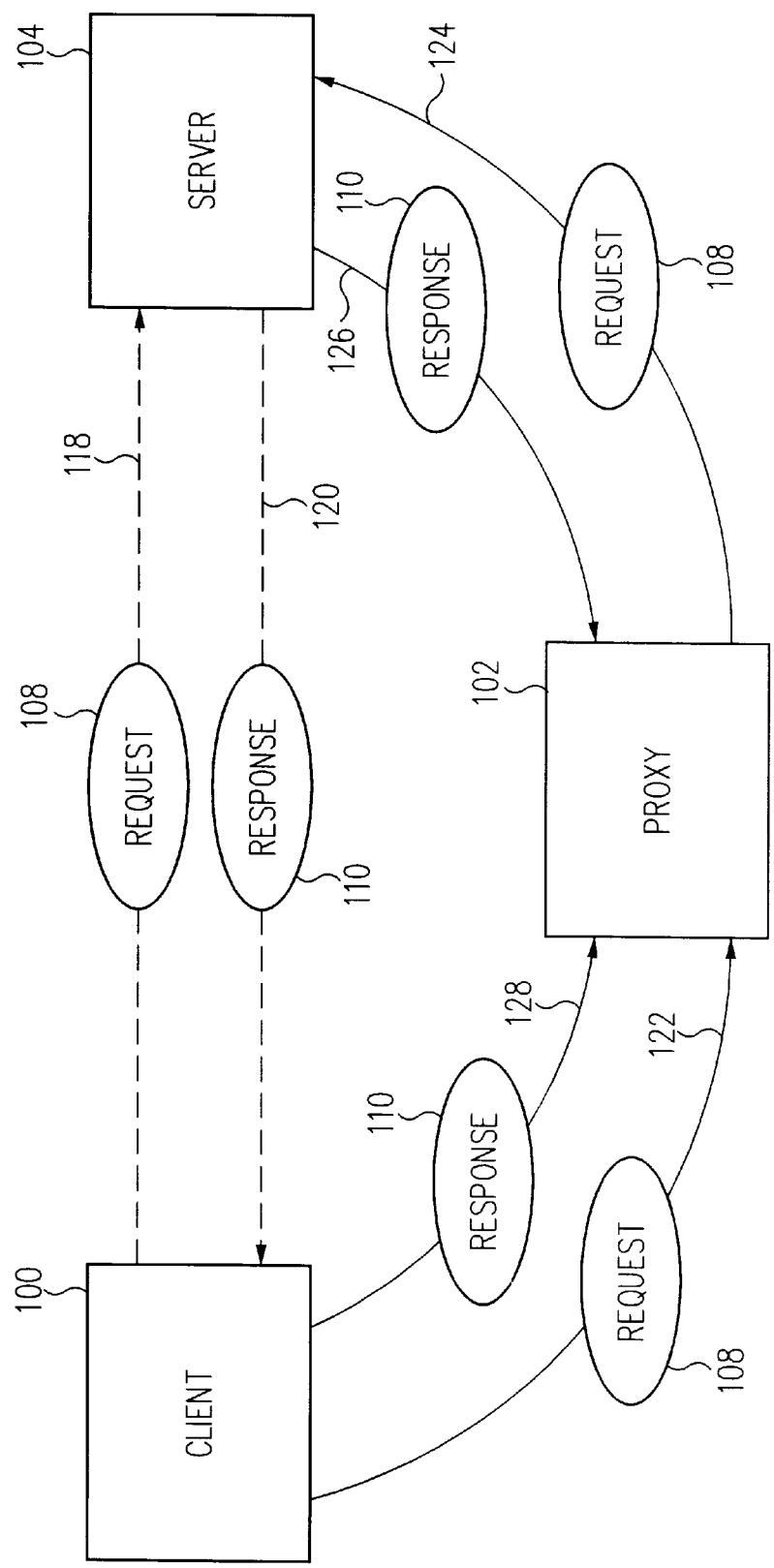
FIGS. 1A–1B illustrate existing Web page processing and handling.
Figure 1B:
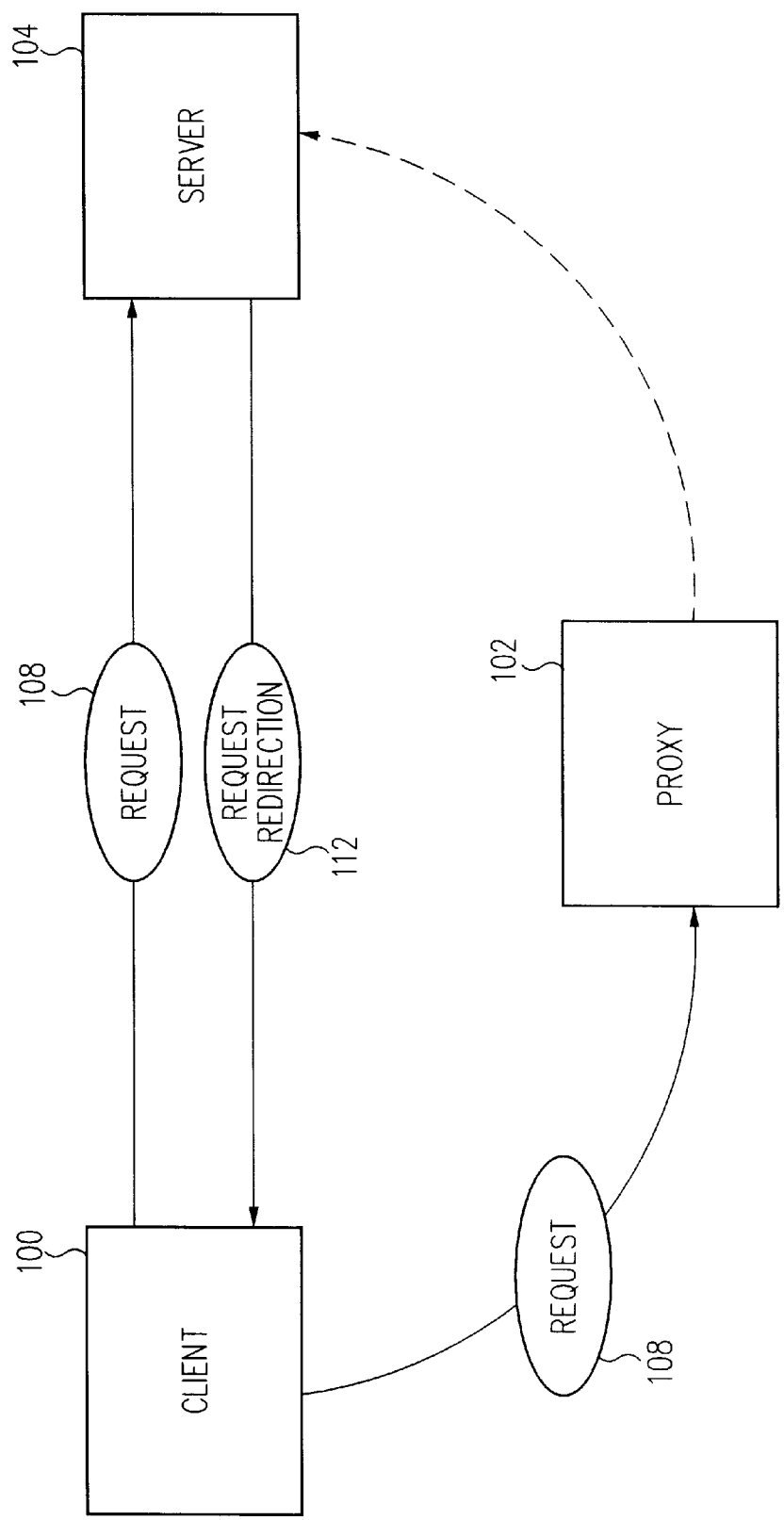
Figure 2:
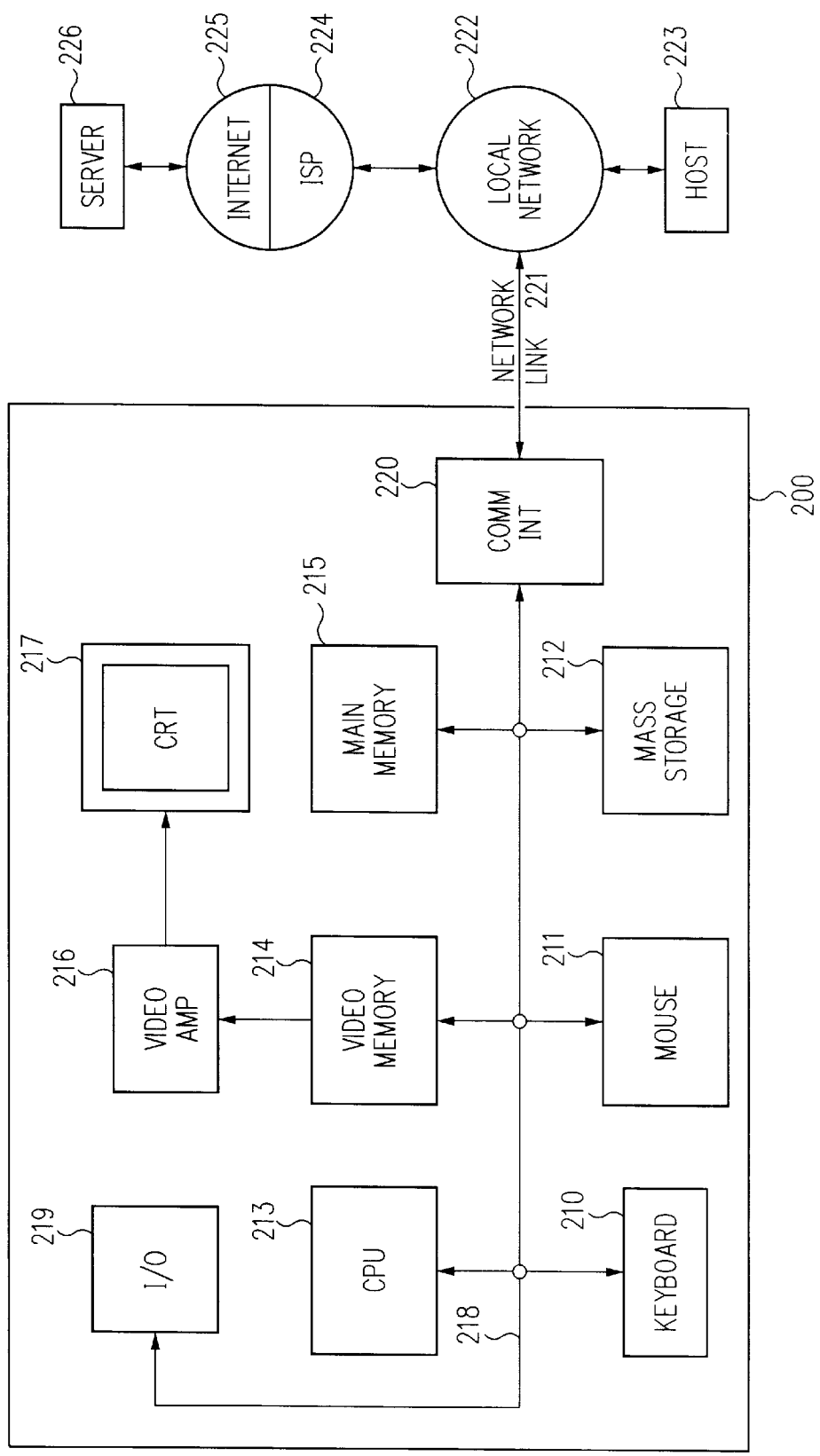
FIG. 2 is a block diagram of one embodiment of a computer system capable of providing a suitable execution environment for an embodiment of the invention.

An embodiment of the invention can be implemented as computer software in the form of computer readable code executed on a general purpose computer such as computer 200 illustrated in FIG. 2, or in the form of bytecode class files executable within a runtime environment (e.g., a Java runtime environment) running on such a computer. A keyboard 210 and mouse 211 are coupled to a bi-directional system bus 218. The keyboard and mouse are for introducing user input to the computer system and communicating that user input to processor 213. Other suitable input devices may be used in addition to, or in place of, the mouse 211 and keyboard 210. I/O (input/output) unit 219 coupled to bidirectional system bus 218 represents such I/O elements as a printer, A/V (audio/video) I/O, etc.

Computer 200 includes a video memory 214, main memory 215 and mass storage 212, all coupled to bidirectional system bus 218 along with keyboard 210, mouse 211 and processor 213. The mass storage 212 may include both fixed and removable media, such as magnetic, optical or magnetic optical storage systems or any other available mass storage technology. Bus 218 may contain, for example, thirty-two address lines for addressing video memory 214 or main memory 215. The system bus 218 also includes, for example, a 32-bit data bus for transferring data between and among the components, such as processor 213, main memory 215, video memory 214 and mass storage 212. Alternatively, multiplex data/address lines may be used instead of separate data and address lines.

In one embodiment of the invention, the processor 213 is a microprocessor manufactured by Motorola, such as the 680×0 processor or a microprocessor manufactured by Intel, such as the 80×86, or Pentium processor, or a SPARC™ microprocessor from Sun Microsystems, Inc. However, any other suitable microprocessor or microcomputer may be utilized. Main memory 215 is comprised of dynamic random access memory (DRAM). Video memory 214 is a dual-ported video random access memory. One port of the video memory 214 is coupled to video amplifier 216. The video amplifier 216 is used to drive the cathode ray tube (CRT) raster monitor 217. Video amplifier 216 is well known in the art and may be implemented by any suitable apparatus. This circuitry converts pixel data stored in video memory 214 to a raster signal suitable for use by monitor 217. Monitor 217 is a type of monitor suitable for displaying graphic images. Alternatively, the video memory could be used to drive a flat panel or liquid crystal display (LCD), or any other suitable data presentation device.

Computer 200 may also include a communication interface 220 coupled to bus 218. Communication interface 220 provides a two-way data communication coupling via a network link 221 to a local network 222. For example, if communication interface 220 is an integrated services digital network (ISDN) card or a modem, communication interface 220 provides a data communication connection to the corresponding type of telephone line, which comprises part of network link 221. If communication interface 220 is a local area network (LAN) card, communication interface 120 provides a data communication connection via network link 221 to a compatible LAN. Communication interface 220 could also be a cable modem or wireless interface. In any such implementation, communication interface 220 sends and receives electrical, electromagnetic or optical signals which carry digital data streams representing various types of information.

Network link 221 typically provides data communication through one or more networks to other data devices. For example, network link 221 may provide a connection through local network. 222 to local server computer 223 or to data equipment operated by an Internet Service Provider (ISP) 224. ISP 224 in turn provides data communication services through the world wide packet data communication network now commonly referred to as the "Internet" 225. Local network 222 and Internet 225 both use electrical, electromagnetic or optical signals which carry digital data streams. The signals through the various networks and the signals on network link 221. and through communication interface 220, which carry the digital data to and from computer 200, are exemplary forms of carrier waves transporting the information.

Computer 200 can send messages and receive data, including program code, through the network(s), network link 221, and communication interface 220. In the Internet example, remote server computer 226 might transmit a requested code for an application program through Internet 225, ISP 224, local network 222 and communication interface 220.

The received code may be executed by processor 213 as it is received, and/or stored in mass storage 212, or other non-volatile storage for later execution. In this manner, computer 200 may obtain application code in the form of a carrier wave.

Application code may be embodied in any form of computer program product. A computer program product comprises a medium configured to store or transport computer readable code or data, or in which computer readable code or data may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment, including embedded devices (e.g., web phones, etc.), personal digital assistant ("PDA") and "thin" client processing environments (e.g., network computers (NC's), etc.) that support a virtual machine.

Network Traffic Flow and Proxy Insertion

Figure 3:
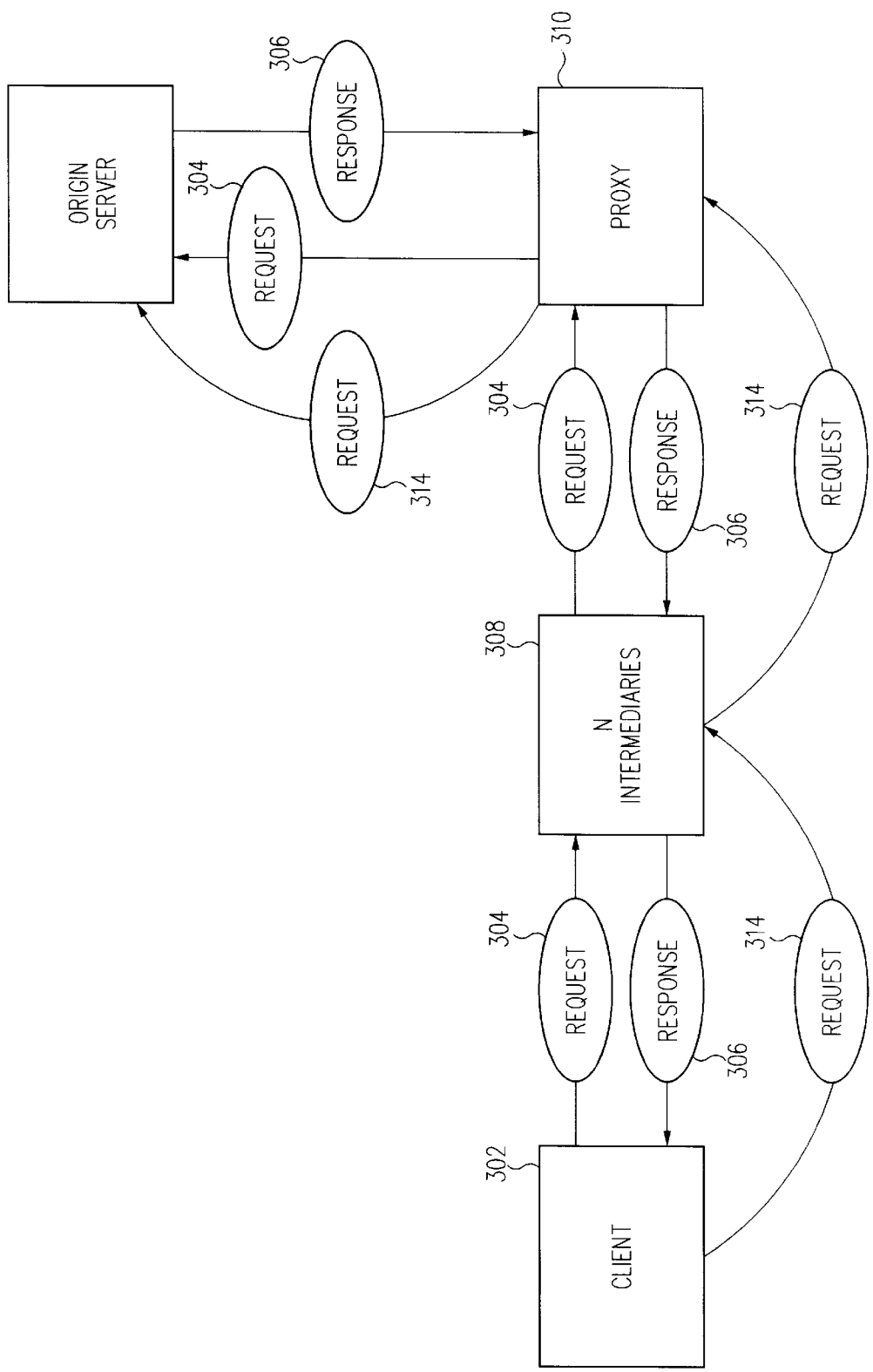
FIG. 3 provides an overview of proxy insertion in network traffic flow according to one or more embodiments of the invention.

In one or more embodiments of the invention, a request directed to a server or a response directed to a client may be altered to insert a plurality of intermediate or final destination designations. In so doing, a path of a request or response, and/or a subsequent request or response, may be altered dynamically. FIG. 3 provides an overview of proxy insertion in network traffic flow according to one or more embodiments of the invention.

Client 302 sends request 304 that is directed to origin server 312. While other locations may temporarily store a given resource, origin server 312 is the server on which the resource permanently resides and/or is created, for example. Embodiments of the invention are described with reference to the Internet, however, it should be apparent that any type of communications network architecture (e.g., Local Area Network (LAN), Metropolitan Area Network (MAN), Wide Area Network (WAN), etc.) may be used with embodiments of the invention. Further, while embodiments of the invention are described with reference to the HTTP and/or HTML, it should be apparent that other communications protocols and definitional languages (e.g., SGML and XML) may be used with one or more embodiments of the invention.

Request 304 is, for example, an HTTP request that identifies origin server 312 using a URL (or other identifier such as a Internet Protocol (IP) Address). In addition, Request 304 may contain none or more "thru-proxy" tags that identify another possible destination (e.g., intermediate- or ultimate destination) of request 304. According to one embodiment of the invention, "thru-proxy" tag is located in a header portion (e.g., an HTTP header portion) of request 304 and as the following form:

Thru-Proxy:<proxy identifier> where the proxy identifier may be a hostname, an IP address, a cluster identification, or an IP multicast address, for example. Alternatively, the thru-proxy tag may be placed in the data or other portion of the message instead of the header portion. For example, a thru-proxy tag may be included in a Web page's HTML definition. A thru-proxy tag may be part of a <HEAD> element, HREF (i.e., hypertext reference), or IMG (i.e., image reference), for example. Typically, a message header is processed by the server software and the data portion is passed to another software mechanism such as a CGI or application-level software. Thus, the CGI or other software can add and/or process a thru-proxy tag. This is beneficial when, for example, an older version of server software is being used that is unaware of the thru-proxy tag mechanism. Thus embodiments of the invention may be used with older servers without adding another proxy to handle a thru-proxy tag.

To illustrate, the following provides an example of a thru-proxy tag with an HREF in an anchor (i.e., "<a.../>") HTML element according to an embodiment of the invention:

<A HREF="www.server.com/webpage.html" THRU-PROXY=www.proxy.com> CLICK HERE
</A>

In the above example, a thru-proxy tag is included in an anchor element's definition in conjunction with an HREF tag. The anchor element may be associated with a line of text that is to be displayed by a browser, for example. If a user selects the text, the browser causes a request (e.g., an HTTP GET request) to be generated to retrieve the "webpage.html" resource (e.g., an HTML definition of a web page). The request includes the thru-proxy tag that identifies the "www-.proxy.com" intermediary node. If the request is to be sent to the "www.server.com" node, the request is to be sent to "www.proxy.com" (ie., the network intermediary node) designated in the thru-proxy tag before it is sent to the "www.server.com".

Request 304's path may include some number, "N," (i.e., none or more) intermediaries 308. Request 304 may be satisfied by one of intermediaries 308 such that there is no need to send the request to origin server 312. However, if the request is to be sent to origin server and request 304 contains a thru-proxy tag, request 304 is sent to the proxy (or other intermediary) specified by the thru-proxy tag. If, for example, request 304 contained a thru-proxy tag that identifies proxy 310, request 304 is to be sent to proxy 310 before it is sent to origin server 312. That is, client 302 and/or intermediaries 308 may send request 304 to destinations other than origin server 312. However, before request 304 is sent to origin server 312, the sender sends request 304 to the destination identified by the thru-proxy tag (e.g., proxy 310). In the example provided in FIG. 3, request 304 is forwarded directly from proxy 310 to origin server 312. However, it is contemplated that proxy 310 may send request 304 to one or more of intermediaries 308 that may or may not send request 304 to origin server 312.

In one or more embodiments of the invention, an entity that originates, receives and/or processes request 304 (e.g., client 302, intermediaries 308, proxy 310 and/or origin server 312) may add one or more thru-proxy tags to request 304. The entity that is identified in a thru-proxy tag may remove the tag from request 304. Similarly, an entity that receives and/or processes response 306 may add a thru-proxy tag to response 306, and the entity that is identified in a thru-proxy tag may remove the tag from response 306.

As response 306 is transmitted to client 302, an entity (e.g., origin server 312, proxy 310, intermediaries 308) may add one or more thru-proxy tags. If response 306 is received by client 302 with one or more thru-proxy tags, client 302 retains this information. If a subsequent, related request (e.g., 314) of response 306 is generated by client 302, one or more thru-proxy tags may be added to the subsequent request. A request may be related in that it is generated from a selection made from within a Web page (e.g., a hypertext link within a Web page) that is transmitted in response 306, for example. To illustrate, request 304 may be a request for a Web page for display on a browser executing at client 302 and response 306 transmits the requested page to client 302. The selection of a hyperlink that is displayed in the Web page causes a request to be generated to retrieve the hyperlinked resource (e.g., another Web page). If a thru-proxy tag was received in response 306, it is included in the request for the hyperlinked resource.

Embodiments of the invention contemplate the use of thru-proxy tags at various levels. For example, there may be one or more default thru-proxy designations as well as specific thru-proxy designations that may override or supplement the default designation(s). In embodiments of the invention, a default thru-proxy tag is associated with a response (e.g., contained in an HTTP header, as discussed above, while a more specific thru-proxy tag is associated with an element of the response. For example, a specific thru-proxy tag may be a field within an HTML element definition (e.g., an "A," i.e., hypertext anchor, element or an "IMG," i.e., image, element).

In the hyperlink example above, response 306 may contain a default thru-proxy tag as well as a thru-proxy tag that is associated with the hyperlinked resource. In one embodiment of the invention, the thru-proxy tag associated with the hyperlinked resource overrides the default thru-proxy tag. Client 302 generates a request that contains the hyperlinked resource's thru-proxy tag. In another embodiment of the invention, the thru-proxy tag associated with the hyperlinked resource may be used in conjunction with the default thru-proxy tag. That is, client 302 generates a request that contains both the hyperlinked resource's thru-proxy tag as well as the default thru-proxy tag.

When a request contains multiple thru-proxy tags, embodiments of the invention visit the entities in the order in which the thru-proxy tags appear in the request. If a proxy or other destination that is identified in a thru-proxy tag (e.g., proxy 310) is unavailable, embodiments of the invention assume that the source (e.g., origin server 312) is unavailable and behave accordingly. Alternatively, in an embodiment of the invention, the source (e.g., origin server 312) is consulted to determine the appropriate action to be taken. Embodiments of the invention allow for the designation of multiple thru-proxy tags such that one designation may be used as an alternate of another. Alternate proxy designations may be used for redundancy and/or load balancing, for example. Thus, if a proxy is unavailable or busy, a proxy specified in an alternate thru-proxy designation may be used in its place.

Referring to FIG. 3, it is possible that one of intermediaries, for example, may send request 304 directly to origin server 312 bypassing proxy 310. In one or more embodiments of the invention, origin server 312 forwards request 304 to proxy 310. Proxy 310 processes request 304 and, if necessary, forwards request 304 to server 312.

In embodiments of the invention, different thru-proxy tags may be specified for different protocols (e.g., HTTP, Secure Hypertext Transport Protocol (HTTPS), file transfer protocol (FTP), gopher, etc.). Thus, where a secure transmission is being sent using HTTPS, for example, a thru-proxy tag may specify a secure proxy that decrypts the message before it is forwarded onto the next location.

Client Process Flow

Figure 4:
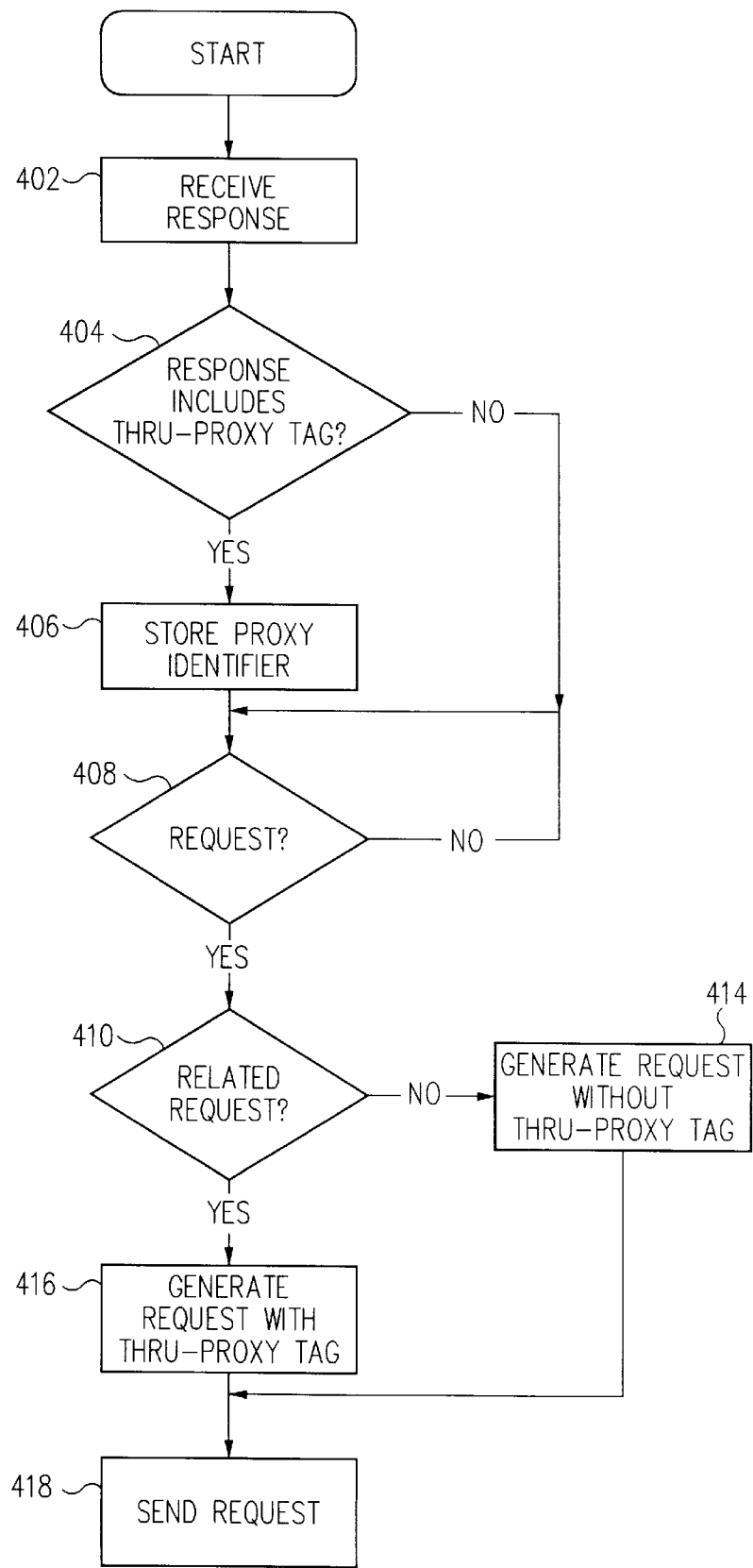
FIG. 4 provides a client process flow according to one or more embodiments of the invention.

According to one or more embodiments of the invention, client 302 may add a thru-proxy tag to request 314 based on a thru-proxy tag received in response 306. According to one or more embodiments of the invention, on client 302, a browser or other application, applet or other software or program code may implement the behavior configured to add a thru-proxy tag to request 314 and/or retrieve thru-proxy tag information from response 306. FIG. 4 provides a client process flow according to one or more embodiments of the invention.

At step 402, client 302 receives response 306. Client 302 (e.g., a browser or, other application or applet software executing on client 302) determines whether the response contains a thru-proxy tag. If yes, processing continues at step 406 to store the resource locator or identification information in the thru-proxy tag. If not, processing continues at step 408 to await another request.

If a user initiates another request, at step 408, processing continues at step 410 to determine whether the request is a related request (e.g., a hypertext link within the response page or a URL that identifies the previous request's origin server). If not, client 302 generates a request, at step 414, without a thru-proxy tag. If the request is a related request (i.e., related to a response), client 302 generates a request, at step 412, that contains one or more thru-proxy tags that identify a proxy specified in a related response. For example, client 302 uses the default thru-proxy identifier unless it is overridden by a more specific thru-proxy tag identifier(s). Client 302 sends the request at step 418. Client 302 may, for example, send the request to a proxy identified in a thru-proxy tag (e.g., proxy 310), or to an intermediary (e.g., one of intermediaries 308). Processing continues at step 402 to process a response to the request, if any.

Origin Server Process Flow

Figure 5:
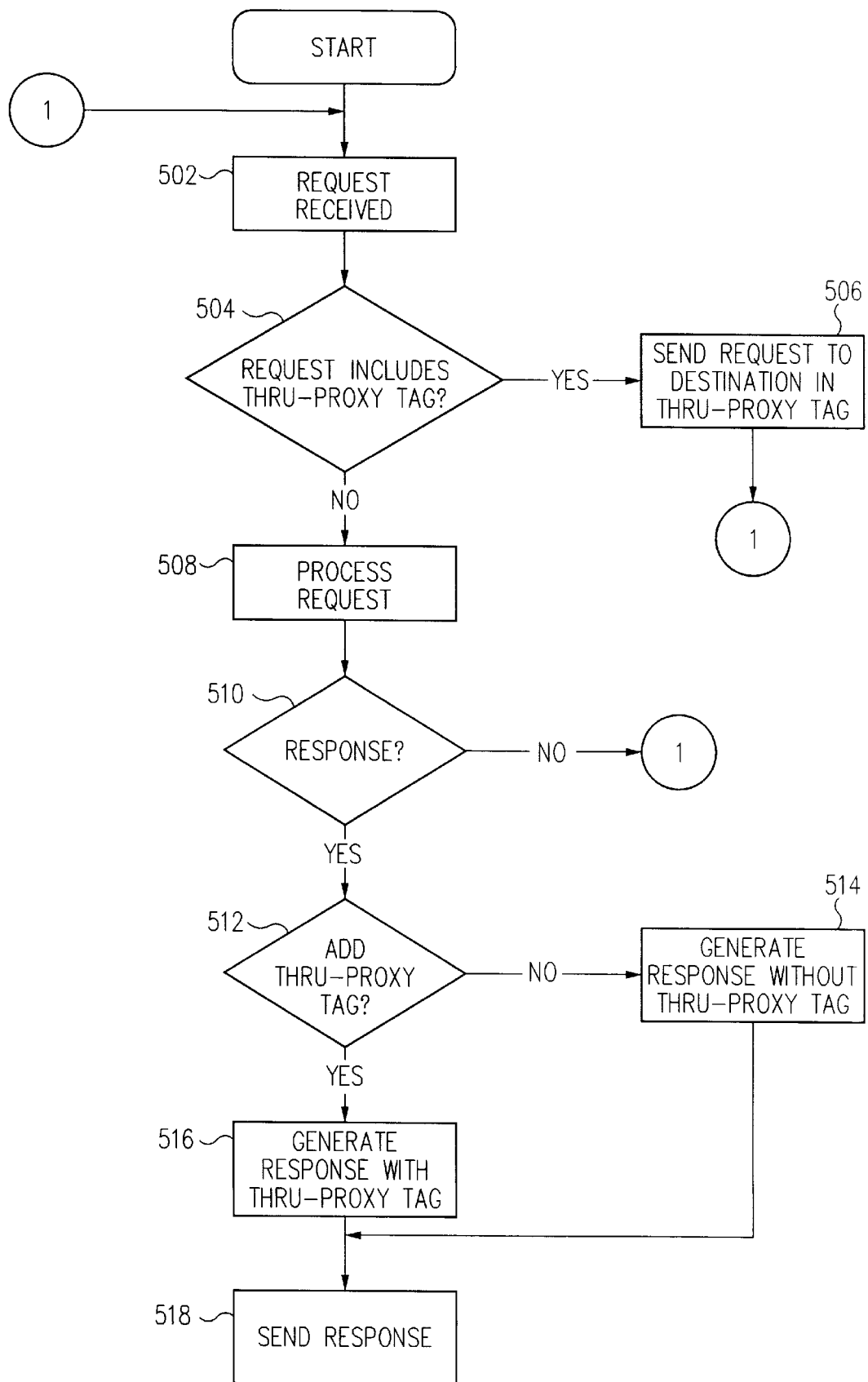
FIG. 5 provides a origin server process flow according to one or more embodiments of the invention.

According to one or more embodiments of the invention, origin server 312 may add a thru-proxy tag to a response (response 306). Server software, CGI, application, applet or other software or program code may be used to implement the behavior of an origin server according to one or more embodiments of the invention. FIG. 5 provides a origin server process flow according to one or more embodiments of the invention.

A request is received by origin server 312 at step 502. At step 504, a determination is made whether the request contains a thru-proxy tag. If so, origin server 504 sends the request to the destination identified in the thru-proxy tag at step 506. If not, processing continues at step 508 to process the request. At step 510, a determination is made whether there is a response to the request. If not, processing returns to step 502 to await another request.

If there is a response to the request, processing continues to step 512 to determine whether the response is to contain a thru-proxy tag (e.g., whether a subsequent request is to be directed to a proxy before origin server 312). If not, processing continues at step 514 to generate a response without a thru-proxy tag. Otherwise, processing continues at step 516 to generate a response with one or more thru-proxy tags. Once a response is generated, it is sent at step 518. Processing continues at step 502 to await another request.

Intermediary Process Flow

Figure 6:
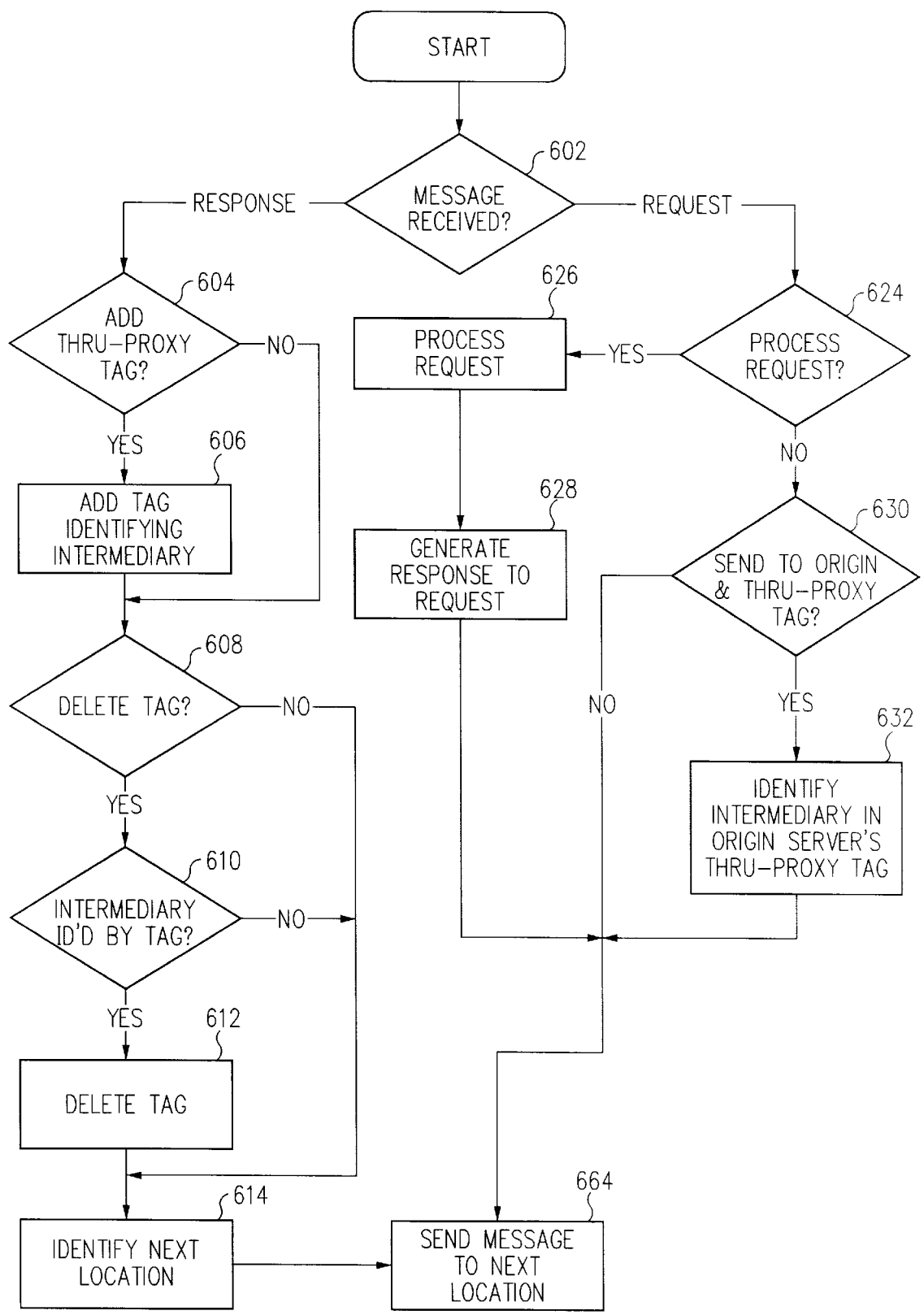
FIG. 6 provides an intermediary process flow according to one or more embodiments of the invention.

According to one or more embodiments of the invention, an intermediary (e.g., intermediaries 308) may add a thru-proxy tag to a request (e.g., request 314) or response (response 306), and delete a thru-proxy tag where the intermediary is identified in the thru-proxy tag to be deleted. Server software, CGI, application, applet or other software or program code may be used to implement the behavior of an intermediary according to one or more embodiments of the invention. FIG. 6 provides an intermediary process flow according to one or more embodiments of the invention.

At step 602, a determination is made as to the type of message received. If the message is a response message, processing continues at step 604. At step 604, a determination is made whether to add a thru-proxy tag. If so, processing continues at step 606 to add the thru-proxy tag that identifies a network node or location (e.g., one of intermediaries 308, proxy 310, or origin server 312 may act as an intermediary for another).

An intermediary may also delete a tag. Thus, at steps 608 and 610, determinations are made whether a delete operation is to be done and whether the intermediary is the one specified in the thru-proxy tag to be deleted. If so, processing continues at step 612 to delete the thru-proxy tag, and processing continues at step 614 to identify the next network node or location to which the message is to be sent. If no deletion is to be performed, processing continues at step 614. Once the next network node is determined, processing continues at step 664 to forward the request to the next location.

If it is determined at step 602 that the message is a request message (e.g., by examining the operation or method identified in the message), processing continues at step 624 to determine whether the intermediary is to process the request to generate a response. If so, the request is processed at step 626 to generate a response to the request at step 628. Processing continues at step 604 to determine whether to add or delete thru-proxy tags from the response and to determine the next network node or location to which the response is to be sent. At step 664 the response is forwarded to the next location.

If it is determined, at step 624, that the intermediary is not processing the request to generate a response, processing continues at step 630 to determine whether the next location is origin server 312 and there is a thru-proxy tag. If so, processing continues at step 632 to identify the next location as the intermediary identified in the thru-proxy tag for origin server 312. Processing continues at step 604 to add or delete thru-proxy tags, if any.

Application Examples

Embodiments of the invention may be used in various applications. For example, in a reverse proxy application in which the reverse proxy acts as a gateway between an external network (e.g., the Internet) and an internal network (e.g., an intranet), a thru-proxy tag may be used to identify a proxy that is able to map external identifiers to internal resources. In the past, the reverse proxy modified the resource identifiers (e.g., URLs) so that each one referred to the reverse proxy. That is, each URL in a Web page is modified to point to the reverse proxy before the Web page is sent to client 302, for example. Using embodiments of the invention, however, a thru-proxy tag may be used to identify the reverse proxy thereby eliminating the need to rewrite the identifiers.

Content rewriting at an Internet Service Provider (ISP) may be outsourced using the thru-proxy tag. The thru-proxy tag may be used to identify a reliable, assured server-side proxy for content rewriting, including composing from multiple pages and per-user group customization. A thru-proxy tag may be used to identify a distill proxy that can transform an image's resolution to accommodate handheld devices with limited video capability. Instead of installing a distill proxy on a corporate intranet and having it configured as a parent proxy by the system administrator, the thru-proxy tag may be used to identify the distill proxy.

Embodiments of the invention may be used to provide load balancing and failure recovery across multiple web server farms as well as provisioning of heterogeneous content. Embodiments of the invention may also be used to achieve fine-grained per-page proxy settings, rather than a static proxy specification encoded in browser preferences or configuration files.

Thus, a method and apparatus for dynamic proxy insertion in network traffic flow has been described in conjunction with one or more specific embodiments. The invention is defined by the claims and their full scope of equivalents.

What is claimed is:

1. In a computer system, a method of dynamically inserting a node in network traffic flow comprising:
   designating a plurality of intermediary network nodes in a response to a first request;
   designating at least one of said plurality of intermediary network nodes in a second request when said second request is related to said response, wherein said plurality of intermediary network nodes comprise at least two intermediary network node designations;
   directing said second request to said at least two intermediary network node designations according to an order of designation in said second request.

2. A computer program product comprising:
   a computer usable medium having computer readable program code embodied therein configured to dynamically insert a network node comprising:
      computer readable program code configured to cause a computer to designate a plurality of intermediary network nodes in a response to a first request;
      computer readable program code configured to cause a computer to designate at least one of said plurality of intermediary network nodes in a second request when said second request is related to said response, wherein;
         said plurality of intermediary network nodes comprise at least two intermediary network node designations, said computer program product further comprising:
            computer readable program code configured to cause a computer to direct said second request to said at least two intermediary network node designations according to an order of designation in said second request.

3. In a computer system, a method of dynamically inserting a node in network traffic flow comprising:
   designating a plurality of intermediary network nodes in a response to a first request;
   designating at least one of said plurality of intermediary network nodes in a second request when said second request is related to said response, wherein designating a plurality of intermediary network nodes in a response further comprises:
      designating one of said plurality of intermediary network nodes in said response as a default intermediary network node;
      designating another of said plurality of intermediary network nodes in said response as an override intermediary network node.

4. The method of claim 3 wherein said override intermediary network node is related to a portion of said response, said designating at least one of said plurality of intermediary network nodes in a second request further comprises:
   designating said override intermediary node in said second request when said second request is associated with said portion of said response;
   designating said default intermediary network node in said second request when said second request is not associated with said portion of said response.

5. A system comprising:
   a first network node configured to generate a response to a first request, said response including a plurality of intermediary network node designations;
   a second network node configured to receive said response and to generate a plurality of requests related to said response, said second network node configured to include at least one of said plurality of intermediary network node designations in said plurality of requests, wherein;
      one of said plurality of intermediary network node designations is a default and the remainder of said plurality of intermediary network node designation are capable of overriding said default.

6. A computer program product comprising:
   a computer usable medium having computer readable program code embodied therein configured to dynamically insert a network node comprising:
      computer readable program code configured to cause a computer to designate a plurality of intermediary network nodes in a response to a first request;
      computer readable program code configured to cause a computer to designate at least one of said plurality of intermediary network nodes in a second request when said second request is related to said response, wherein;
         computer readable program code configured to cause a computer to designate a plurality of intermediary network nodes in a response further comprises:
            computer readable program code configured to cause a computer to designate one of said plurality of intermediary network nodes in said response as a default intermediary network node;
            computer readable program code configured to cause a computer to designate another of said plurality of intermediary network nodes in said response as an override intermediary network node.

7. The computer program product of claim 6 wherein said override intermediary network node is related to a portion of said response, said computer readable program code configured to cause a computer to designate at least one of said plurality of intermediary network nodes in a second request further comprises:
   computer readable program code configured to cause a computer to designate said override intermediary node in said second request when said second request is associated with said portion of said response;
   computer readable program code configured to cause a computer to designate said default intermediary network node in said second request when said second request is not associated with said portion of said response.

* * * * *